United States Patent [19]

Kobayashi

[11] 3,923,536
[45] Dec. 2, 1975

[54] METHOD AND APPARATUS FOR BURNING RAW MATERIALS OF CEMENT CLINKER

[75] Inventor: Toshihiro Kobayashi, Tokyo, Japan

[73] Assignee: Ishikawajima-Harima Jukogyo Kabushiki Kaisha, Tokyo, Japan

[22] Filed: Nov. 19, 1973

[21] Appl. No.: 416,960

[30] Foreign Application Priority Data
July 3, 1973  Japan.............................. 48-74451

[52] U.S. Cl. ............................................... 106/100
[51] Int. Cl.² ........................................... C04B 7/44
[58] Field of Search ................................... 106/100

[56] References Cited
UNITED STATES PATENTS

| | | |
|---|---|---|
| 2,871,133 | 1/1959 | Palonen et al. ..................... 106/100 |
| 3,212,764 | 10/1965 | Muller et al. ....................... 106/100 |
| 3,317,201 | 5/1967 | Muller et al. ....................... 106/100 |
| 3,451,665 | 6/1969 | Strassen .............................. 106/100 |
| 3,622,363 | 11/1971 | Van Dornick ...................... 106/100 |
| 3,692,287 | 9/1972 | Kohl et al. ........................... 106/100 |
| 3,703,275 | 11/1972 | Sylvest ................................ 106/100 |

Primary Examiner—J. Poer
Attorney, Agent, or Firm—Scrivener Parker Scrivener & Clarke

[57] ABSTRACT

Preheated combustion air from a clinker cooler to be supplied to a calcining device of a suspention preheater and gas discharged from a rotary kiln (hereafter called kiln exhaust gas) are mixed so as to cool volatile matters contained in the kiln exhaust gas and condense them on the surface of dust contained in the kiln gas. Then volatile matter carrying dust is separated and discharged out of the processing system.

1 Claim, 3 Drawing Figures

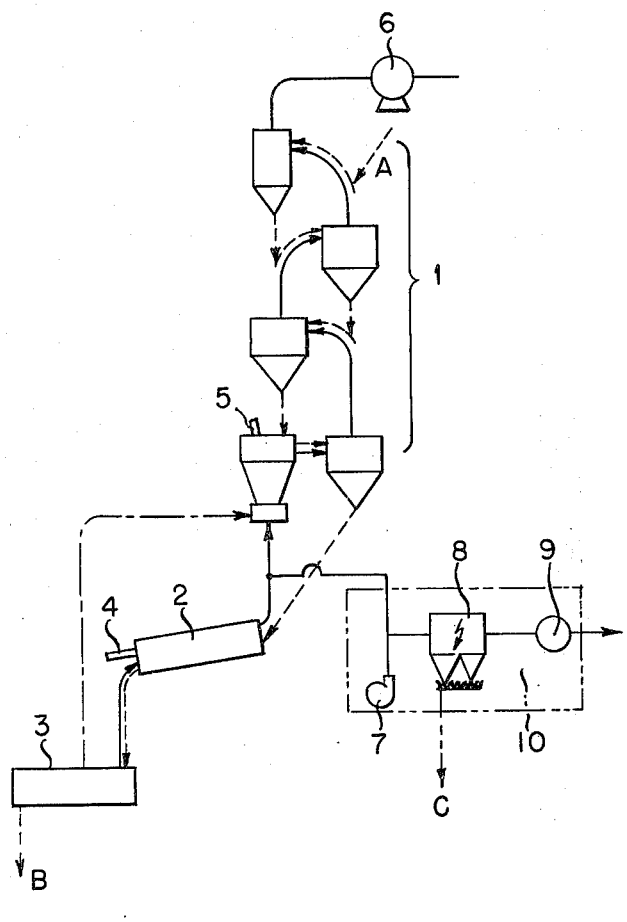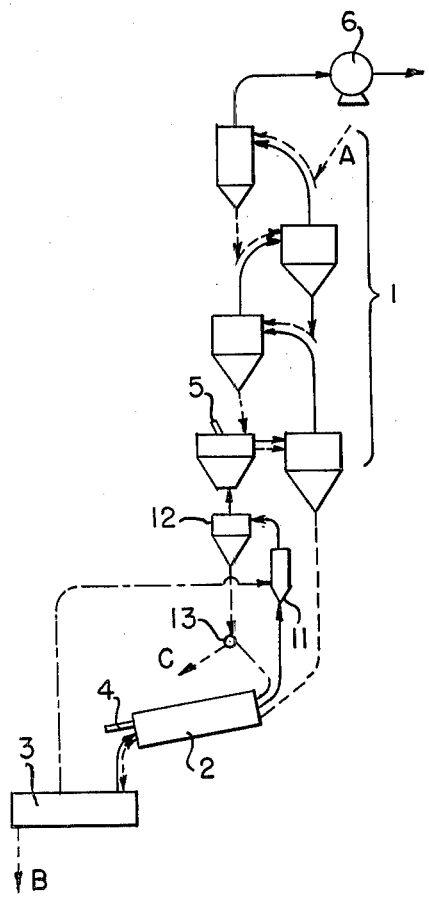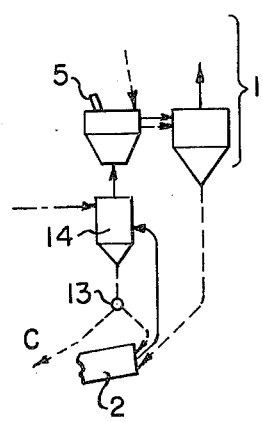

METHOD AND APPARATUS FOR BURNING RAW MATERIALS OF CEMENT CLINKER

The present invention relates to a method and apparatus for burning raw materials of cement clinker, especially with raw materials and/or fuel containing high amount of volatile matters such as alkali, chlorine and sulfur to produce cement with a low alkali content ($Na_2O$ being less than 0.6%).

The above and other objects, features and advantages of the present invention will become more apparent from the following description of preferred embodiments thereof taken in conjunction with the accompanying drawing.

FIG. 1 is a diagrammatic view of a conventional rotary kiln with a suspension preheater;

FIG. 2 is a diagrammatic view of the first embodiment of a rotary kiln with a suspension preheater in accordance with the present invention; and FIG. 3 is a view of the second embodiment.

Throughout FIGURES same reference numerals are used to designate similar parts.

Prior to the description of the preferred embodiments of the present invention, a conventional rotary kiln will be described briefly with reference to FIG. 1 in order to specifically point out the problems and defects thereof. The conventional rotary kiln with a suspension preheater having a secondary burner or burners for calcining (hereafter called a calcining burner) is of the type further including a bypass device for removing volatile matters. The raw materials of cement clinker are charged into a suspension preheater 1 through a feeding port A of the uppermost stage as indicated by the broken line arrow and as they flow down from one stage to the next stage of the suspension preheater 1, they are heated up further by the higher temperature gas (indicated by the solid line arrow). At the last stage of the suspension preheater, they are heated not only by exhaust gas from a rotary kiln 2 but also by gas generated by the combustion of fuel supplied to a calcining butner 5 with preheated combustion air from a clinker cooler 3 as indicated by the one dot chain lines. Owing to these sufficient heat source supplied the calcining reactions of the raw materials is substantially completed before they are discharged into the rotary kiln 2. Calcined materials being burned to become the cement clinker by the rotary kiln 2 is then discharged into the clinker cooler 3 to be cooled off by cooling air and discharged through a discharge port B. Of cooling air which has been heated by the clinker, the highest-temperature air is induced into the rotary kiln 2 as indicated by the one-dot chain lines: as the combustion air for a kiln burner 4 and the next highest-temperature air is carried to the suspension preheater 1: as the combustion air for the calcining burner 5. The numeral 6 shows main induced draft fan.

Volatile matters introduced into the system by the raw materials and/or fuel are substantially vaporized at a burning temperature of clinker (about 1,450°C) in the rotary kiln 2 and carried in gaseous phase to the suspension preheater 1 together with the kiln exhaust gas. In the suspension preheater 1 in which heat transfer is carried out while raw materials are suspended by heated gas, raw material powder serves as filter for volatile matters so that they are condensed on its surface and returned to the rotary kiln 2. Volatile matters are gradually accumulated as they are circulated through the system, and the balance or equilibrium is established between the quantity of volatile matters introduced into the system and the quantity of volatile matters discharged out of the system together with the clinker. Depending upon the quantity of volatile matters introduced into the system, the operating conditions, the type of cement clinker to be produced and so on, the concentration of volatile matters circulating through the system becomes a very high amount at an equilibrium point so that a large quantity of coating is formed upon the inner walls of the preheater 1 and/or the fluidity of raw materials is adversely affected. As a result the cyclones and/or raw material chutes of the preheater 1 tend to be clogged very often.

In order to overcome these problems there has been proposed a bypass device generally indicated by 10 in FIG. 1. A part of exhaust gas from the rotary kiln 2 is branched and mixed with cooling air sent by a blower 7 so that accumulated volatile matters in gaseous phase will be rapidly cooled to be condensed on dust held in the kiln gas. The dust carrying volatile matters in turn is collected by an electrical precipitator 8 and discharged out of the system through discharge port C. The kiln exhaust gas free from the kiln dust is wasted to the atmosphere by an induced draft fan 9.

However the bypass device 10 of the type described has many defects and problems to be described hereinafter. Firstly a high temperature gas from the kiln which would have been used effectively for calcining the raw materials in the suspension preheater is partly wasted out of the system so that the heat required for calcining raw materials becomes insufficient. For example when 10% of the kiln exhaust gas is bypassed, the quantity of heat to be added to the calcining device for compensating the wasted heat amounts to 60 – 89 KCal/kg of clinker, which is considerably high as compared with the overall heat consumption of about 800 KCal/kg of clinker for such a rotary kiln installation. Thus the thermal efficiency is remarkably lowered.

Secondly, amount of branched or bypassed gas may be limitted to 10 – 15% of the kiln exhaust gas from a standpoint of thermal economy. However in order to effectively carry the volatile matters out of the system by the said branched or bypassed gas amount, the concentration of volatile matters in the gas must have been considerably increased. Therefore the problems of the formation of the coating on the inner walls of the preheater and of the clogging of the cyclones and/or raw material chutes cannot be avoided perfectly.

Thirdly, the quantity of volatile matters carried out of the system by the branched or bypassed gas is depending upon the amount of bypassed or branched gas and the concentration of volatile matters, and in general 10 – 30% of volatile matters introduced into the system is carried out at most while the remaining volatile matters are discharged together with cement clinker. Therefore when a desired grade is such that the quantity of volatile matters in cement clinker must be less than one half of the quantity of volatile matters introduced into the system, the conventional rotary kiln with a suspension preheater cannot be employed even when the bypass device is provided.

Fourthly, heavy coating is formed to the opening at the branching point leading the kiln exhaust gas to the bypass device so that it is easily narrowed down. As a result stable operation of the bypass device will not be obtained.

Fifthly the electrical precipitator, fan and blower used in the bypass device are very expensive, so that the construction cost is increased. Furthermore the operating cost is also increased because the power consumption of these additional machineries will amount to 1–2 KWH/ton of clinker.

The present invention was made to overcome the above and other problems and defects encountered in the conventional rotary kiln with a suspension preheater. Briefly stated, volatile gases such as $Na_2O$, $K_2O$, $SO_2$ and so on are positively condensed on dust carried by the exhaust gas of the rotary kiln and the dust rich in volatile compounds is separated from the gas and discharged out of the system, in advance the gas being supplied to the calcining device of the suspension preheater.

The first embodiment shown in FIG. 2 is substantially similar to the conventional rotary kiln installation shown in FIG. 1 except that the preheated combustion air supplied from the clinker cooler 3 and the exhaust gas from the rotary kiln 2 are mixed in a mixing chamber 11 and thereafter kiln dust is separated from the mixed gas by a separator 12 so that the mixture of the preheated combustion air and the kiln exhaust gas free from kiln dust may be supplied to the calcining burner 5 for combustion.

By the rotary kiln installation with a suspension preheater 1 in which the raw materials are substantially calcined, the kiln burner 4 will consume about 40% of fuel required by the system whereas the calcining burner 5 will consume about 60%. Cooling air is heated to high temperatures as it cools clinker in the clinker cooler, and under the above fuel consumption air preheated to the highest temperature of about 1,000°C is induced into the rotary kiln 2 whereas the air preheated to 500° – 600°C is induced into the suspension preheater 1. The temperature of the exhaust gas from the rotary kiln 2 is generally 1,000° – 1,100°C, and it contains not only the dust carried over the kiln but also volatile matters vaporized from the materials at the burning temperature of clinker. Although the dust contained in the kiln exhaust gas is dependent upon the gas velocity in the rotary kiln, the peripheral speed of the rotary kiln and so on, generally it will amount to 5 – 10% of clinker produced.

When the air supplied from the clinker cooler 3 is mixed with the exhaust gas from the kiln 2 in the mixing chamber 11, the temperature of mixed gas becomes about 800°C, and more than 70% of volatile matters contained in the kiln exhaust gas is condensed and adheres to kiln dust. The mixing chamber 11 is directly connected with the gas discharge end hood of the rotary kiln 2, and the combustion air supplied from the clinker cooler 3 is so introduced into the mixing chamber that it may flow along the inner wall of the mixing chamber 11 whereas the exhaust gas from the rotary kiln 2 flows at the center. Due to vortexes created in the chamber by the two flows, the air and the kiln gas may be mixed throughly and instantly. If the exhaust gas would make contact with the low temperature inner wall of the mixing chamber, volatile matters would be condensed so as to form a coating on it. This arrangement may help, however, to effectively prevent such adhesion on walls of the mixing chamber and devices thereafter.

The separator 12 may be of a cyclone as an example which separates dust from the mixture of air and kiln exhaust gas. All or a part of the separated dust rich in volatile matters is discharged out of the system by an adjustable splitter 13 installed at the discharge port of the separator 12 through a discharge port C. The remaining dust may be returned through a feed line (indicated by broken line arrow) to the rotary kiln 2. The separator 12 must be so constructed as to lower its pressure loss in view of operating cost. Therefore the separation efficiency may be sacrificed to some extent. Even when the efficiency of the separator 12 is only 70%, one half of volatile matters circulating in the system can be carried out of the system. In addition since the quantity of circulating volatile matters is in any case greater than the quantity of volatile matters newly introduced into the system, the content of the volatile matters in the cement clinker may be reduced even less than one half of the quantity of volatile matters newly introduced into the system when all of the collected dust is discharged out of the system.

Next the method of the present invention will be described in comparison with the conventional method shown in FIG. 1. By the method shown in FIG. 1 the volatile matters contained in the kiln exhaust gas of 10–15% which supposed to be branched into the bypass device 10 is only driven out of the system whereas according to the present invention at least 50% of volatile matters contained in all kiln exhaust gas is carried out of the system. (The condensation efficiency of the mixing chamber 11 is 70% and the separation efficiency of the separator 12 is 70%). Even when all of the separated dust whose temperature is about 800°C are thrown out of the system, the thermal loss is only 7 – 10 KCal per kilogram of clinker. To compensate this thermal loss, additional heat to be supplied for the calcining device will amount to 10 – 20 KCal per kilogram of clinker, but as compared with the conventional bypass device the additional heat consumption is only ⅓ – ¼. Furthermore volatile matters are removed out of the system in a very efficient manner so that the concentration of the circulating volatile matters at the equilibrium point may be lowered. As a result little coating is formed in the duct between the rotary kiln 2 and the mixing chamber 11 and the clogging of the cylones and raw material chutes of the preheater 1 may be completely prevented. It is one of the feature of the invention that the quantity of the volatile matters to be thrown out of the system can be controlled by the splitor in a simple manner depending upon the requirement of the process. For an example assume that low alkali cement clinker with an alkali ($Na_2O$) content of less than 0.6% be produced with raw materials containing 0.8% alkali. The quantity of alkali introduced into the system is equivalent to about 1.2% on clinker base, and the amount of alkali in the separated dust on clinker base is 1.2%, supposing that the quantity of alkali circulating in the system (which is dependent upon volatility of alkali and operating conditions) amounts to be 2.4%, that is alkali concentration of two times. Therefore the alkali content of clinker may be maintained less than 0.6% when about one half of the separated dust is thrown out of the system by adjusting the splitter 13. It is however difficult to predicate precisely the quantity or ratio of volatile matters circulating in the system, due to various factors affected, at the stage when the rotary kiln installation is to be constructed so that the bypass device 10 of a capacity much greater than a actually required capacity must be installed in the conventional rotary kiln installation. But according to the present invention the quantity of volatile matters thrown out of the system may be arbitarily controlled over a wide range by the splitter 13 without making any components of device idle. Furthermore the mixing chamber 11, the separator 12 and the splitter 13 are simple in construction and in expensive as compared with the conventional bypass device 10. Besides the process control may be much facilitated, since the kiln gas is not bypassed or branched.

According to the present invention, volatile matters contained in the exhaust gas from the rotary kiln is cooled by combustion air whose temperature is lower than the gas so as to be condensed and separated so that in the first embodiment the mixing chamber 11 and the separator 12 have been described as being disposed separately so as to simplify the explanation. However in the second embodiment shown in FIG. 3 a cyclone type separator 14 with an upper gas inlet port and a lower inlet port is used. Combustion air supplied from the clinker cooler 3 is introduced into the separator 14 tangentially through the upper inlet port so as to form downwardly helical flow whereas the exhaust gas from the rotary kiln 2 is induced into the separator 14 through the lower inlet port so as to be mixed with the combustion air throughly and instantly, before the dust contained in the gas being separated.

As described hereinbefore and according to the present invention the combustion air supplied from the clinker cooler and the exhaust gas from the rotary kiln are mixed before they are supplied to the calcining burner of the suspension preheater so as to condense volatilate matters on kiln dust, and thereafter the dust is removed from the mixture of combustion air and discharged gas which is supplied to the burner of the preheater so as to calcine the preheated raw materials. All or a part of the separated dust is discharged out of the system, whereby the volatile matters may be discharged out of the system. Therefore it is an important feature of the invention that all of the quantity of volatile matters circulating in the system is a subject for removal. As a result the content of volatile matters in cement clinker may be reduced less than one half of the content of volatile matters newly introduced in the system. Such considerable reduction in volatile matter content of clinker will never be attained by any conventional rotary kiln installation with bypass system in which only the dust rich in volatile matters contained in the branched gas is a subject for removal. Thus the quality of cement may be considerably improved. The method of the present invention is advantageous especially when portland cement with a low alkali content is produced. Furthermore the formation of coating upon the inner walls of the preheater and the clogging of the cyclones and raw material chutes of the preheater can be completely prevented. Since the kiln gas is not removed out of the system but only the dust rich in volatile matters is separated from the kiln gas and then discharged out of the system, the decrease in thermal efficiency is extremely small as compared with the conventional rotary kiln installation employing the bypass system.

The rotary kiln installation in accordance with the present invention includes a mixing chamber for mixing combustion air supplied from a clinker cooler and exhaust gas from a rotary kiln so as to condense volatile matters ontained in the exhaust gas from the rotary kiln thereby adhering condensed volatile matters to kiln dust, a separating device for separating the dust from the mixture of combustion air and discharged gas, a duct for leading the mixture of combustion air and kiln exhaust gas from which dust has been separated to a calcining burner of a suspension preheater, and a splitter for discharging separated dust out of the system of the rotary kiln installation. Therefore the method of the present invention may be accomplished in a very reliable manner. Furthermore all of the quantity of volatile matters circulating in the system is a subject for removal so that the content of volatile matters of cement clinker may be considerably reduced, thereby improving the quality of cement clinker. The rotary kiln installation in accordance with the present invention is therefore advantageous especially when a low alkali content cement clinker is produced. The desirable features of the conventional rotary kiln installation with a suspension preheater are fully utilized in the present invention, but its defect that the coating is formed upon the inner walls of the preheater is completely eliminated so that the reliable operation may be ensured over a long period. Since little coating is formed, the labor required for removal of coating may be eliminated. The quantity of volatile matters to be discharged out of the system may be easily controlled from 0% to 100% by the splitor, depending upon the desired quality of cement clinker, conditions of raw materials and fuel and so on, and as a result unnecessary waste of raw materials and fuel may be prevented. Moreover the number of components which require inspection and maintenance may be reduced, and the construction cost may be remarkably decreased.

What is claimed is:

1. In a method for burning raw materials of cement clinker of the type comprising preheating and calcining raw materials by a suspension preheater provided with a calcining device having a burner, burning raw materials which pass through said preheater to form cement clinker in a rotary kiln, and cooling said cement clinker by a clinker cooler from which the heated air obtained by the cooling of clinker is directly induced to said device and used as its combustion air together with the exhaust gas from said rotary kiln; the improvement which comprises mixing said heated air with said exhaust gas which contains dust, and condensing volatile matters contained in said exhaust gas as gaseous phase thereby adhering said condensed volatile matters to said dust; separating said dust from the mixture of said combustion air and said exhaust gas; supplying said mixture after dust separation to said calcining device, thereby utilizing said mixture for the combustion of said calcining burners; and discharging at least a portion of said separated dust and volatile matters to which said dust is adhered.

* * * * *